United States Patent [19]

Rosenberg

[11] 4,325,167
[45] Apr. 20, 1982

[54] PROCESS FOR THE MANUFACTURE OF ROLLED CAPACITORS

[76] Inventor: Jean M. L. Rosenberg, 83, rue Désirée Richebois, 94 Fontenay-Sous-Bois, France

[21] Appl. No.: 50,997

[22] Filed: Jun. 22, 1979

[30] Foreign Application Priority Data

Jul. 7, 1978 [FR] France ............................... 78 20252

[51] Int. Cl.³ .............................................. H01G 4/18
[52] U.S. Cl. .................................... 29/25.42; 361/323
[58] Field of Search ...................... 361/301, 311, 323; 29/25.42; 174/113 R

[56] References Cited

U.S. PATENT DOCUMENTS

| | | | |
|---|---|---|---|
| 1,010,936 | 12/1911 | Meirowsky | 361/311 X |
| 1,094,718 | 4/1914 | Honold | 361/311 |
| 1,899,591 | 2/1933 | Segar | |
| 2,287,201 | 6/1942 | Scott | |
| 3,214,657 | 10/1965 | Davis | 361/323 X |
| 3,366,853 | 1/1968 | Rayburn | 361/323 |
| 3,621,119 | 11/1971 | Sugiyama | 174/113 R X |
| 3,806,775 | 4/1974 | Edman | 361/323 |

FOREIGN PATENT DOCUMENTS 507242 6/1939 United Kingdom .............. 361/32 B

*Primary Examiner*—Elliot A. Goldberg
*Attorney, Agent, or Firm*—Michael J. Striker

[57] ABSTRACT

A process is disclosed for joining the innermost layers of wound tubular capacitors to form a unitary sleeve which does not deform under pressure exerted by the layers. The layers are joined by heating, pressing or by application of solvent. Capacitors produced by the process are also disclosed.

5 Claims, 3 Drawing Figures

PROCESS FOR THE MANUFACTURE OF ROLLED CAPACITORS

BACKGROUND OF THE INVENTION

The present invention relates to a new process of manufacturing rolled capacitors.

One known method of manufacture consists in winding conductive films and insulating films or films metallized on one side on a cylindrical spindle and then removing the spindle at the end of the winding.

Upon the withdrawal of the spindle the rubbing between the latter and the first turn wound tends to shift the first turns axially, which modifies the characteristics of the capacitor.

Furthermore, the removal of the spindle leaves a hole in the center of the capacitor, which hole should normally be cylindrical but experience has shown that if the first turns are no longer supported they deform, this deformation also modifying the characteristics of the capacitor.

SUMMARY OF THE INVENTION

The process of the invention which remedies these drawbacks consists in making the first wound layers of film integral with each other, when the winding is effected.

In this way there is produced at the center of the winding a rigid cylindrical sleeve which is not capable of undergoing modification in shape during or after the removal of the spindle.

The invention will be better understood by the following description read with reference to the accompanying drawings which are given solely by way of illustration and not of limitation.

DETAILED DESCRIPTION OF PREFERRED EMBODIMENTS

Figure 1:
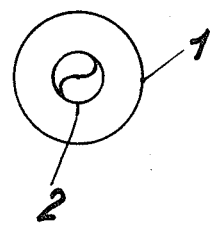
FIG. 1 shows, in end view, an ideal capacitor form.
Figure 2:
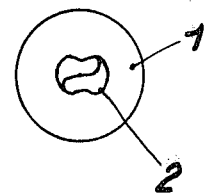
FIG. 2 is a similar view showing the shape of the first turns of the capacitor form after the removal of the spindle.

Referring to the drawing, FIG. 1 shows, as seen in end view, an ideal wound capacitor 1, that is to say a wound capacitor whose central layers 2 have remained cylindrical. FIG. 2 on the other hand shows the shape which the central layers 2 generally assume after the removal of the spindle.

The inventive process resides in making the initial layers integral with each other so as to form a nondeformable rigid cylindrical sleeve.

One apparatus which permits the carrying out of the process of the invention will now be described by way of example with reference to FIG. 3.

The customary metallized films 3 and 4 come from bobbins 5 and 6 and are wound on a bipartite spindle 7 of known type.

During the winding of the first layers 3 and 4 of film, they are made integral with each other by applying to them a hot member 8, the heat liberated by the member 8 effecting a partial fusion of the films. The member 8 can be displaced in a direction which extends radially with respect to the previously wound films at B so as to bring the member 8 into contact with the films during the initial winding thereof and subsequently to move it away so as to permit further winding in a customary way.

If a winding process is used which employs an initial demetallization of device, the demetallization device can be used to control the displacement of the member 8.

Figure 3:
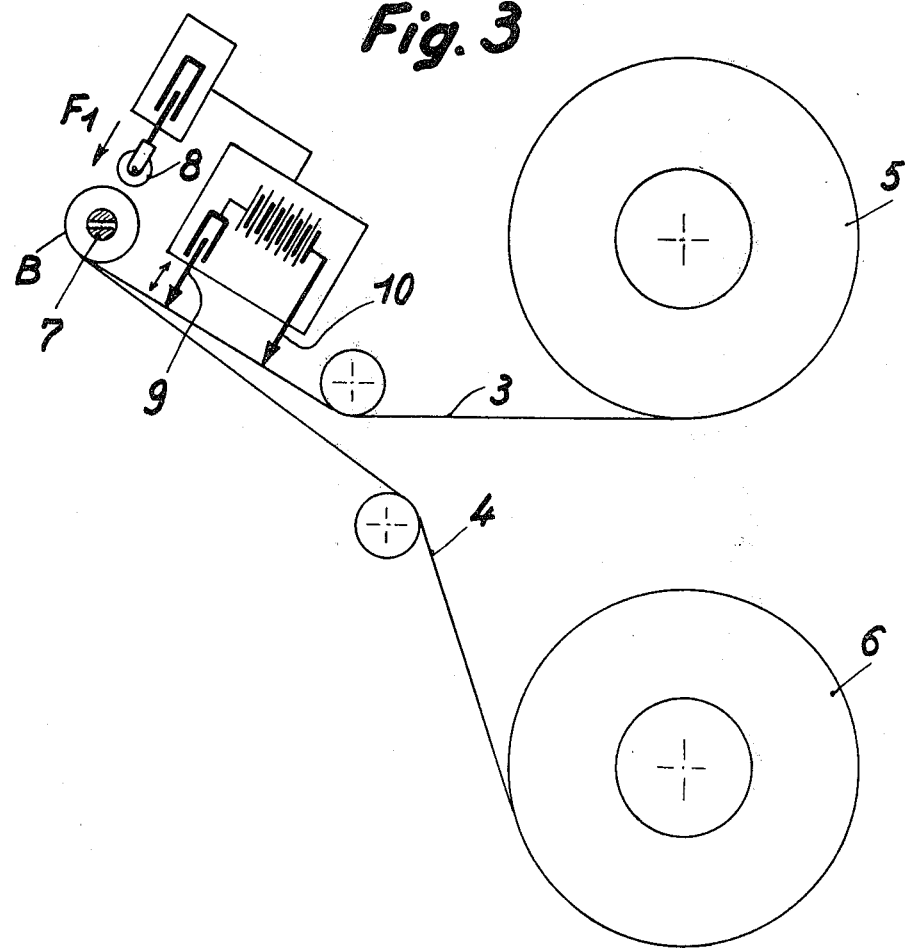
FIG. 3 is a diagrammatic view showing a winding machine which permits the carrying out of the process of the present invention.

As shown in FIG. 3 the demetallization device consists of two electrodes 9 and 10 applied to one of the films and between which a voltage is established, the demetallization terminating upon the retraction of the electrode 9.

Experience has shown that good results were obtained by demetallizing a short length of film and then causing the displacement of the member 8 in the direction indicated by the arrow $F_1$, the retraction of said member being brought about before the retraction of the electrode 9.

The member 8 is preferably formed of an electrical resistor but the initial layers can also be made integral with each other by other means.

Thus one could use an integrating member which consists of a knurled wheel applied with pressure against the initial layers.

There could also be used a member which upon its application against the initial layers deposits a thin layer of solvent on them so as to bond them together.

It should be noted that the process of the invention is distinguished from the known process solely by the change in the initial phase of winding, where the initial layers wound on the spindle are made integral with each other. Of course, after this operation, the manufacture of the capacitor is continued in the customary manner.

I claim:

1. A process of winding wound capacitors upon a rotating spindle by rolling at least two metallized films thereon to form a plurality of overlapping layers of which one is a radially innermost layer, comprising the steps of demetallizing a part of at least one of said films prior to rolling of the radially innermost layer and at least a first layer overlapping said radially innermost layer; bonding said radially innermost layer and at least said first overlapping layer together to form a unitary substantially rigid sleeve on said spindle; and continuing the rolling of said two metallized films without bonding the remaining over-lapping layers together.

2. A process of claim 1, wherein said bonding step includes the application of heat to said innermost layer and said first overlapping layer wound on said spindle whereby said layers at least partially fuse and become inherently joined to one another.

3. The process of claim 1, wherein said bonding step includes the application of solvent to said innermost layer and said first overlapping layer wound on said spindle.

4. The process of claim 1, wherein said bonding step includes the application of pressure to said innermost layer and said first overlapping layer wound on said spindle.

5. The process of claim 4, wherein said pressure is applied by means of a member displaceable to and from said innermost layer and said first overlapping layer.

* * * * *